Nov. 12, 1968  W. L. LUINSTRA  3,410,577
COUPLING DEVICE
Filed Sept. 15, 1966  2 Sheets-Sheet 1
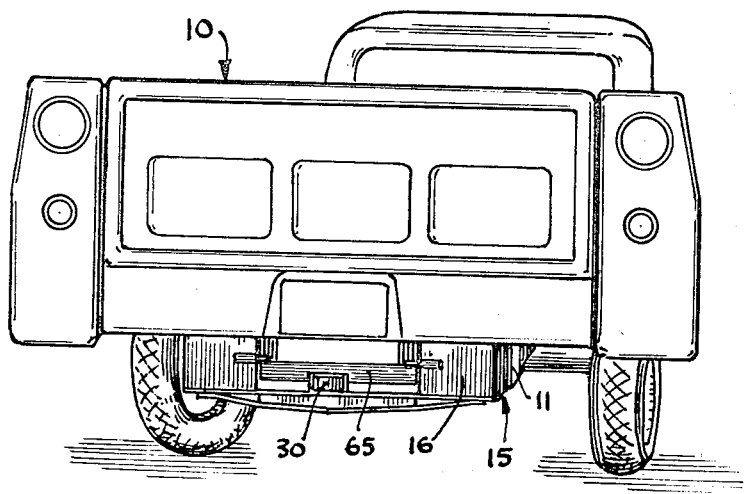
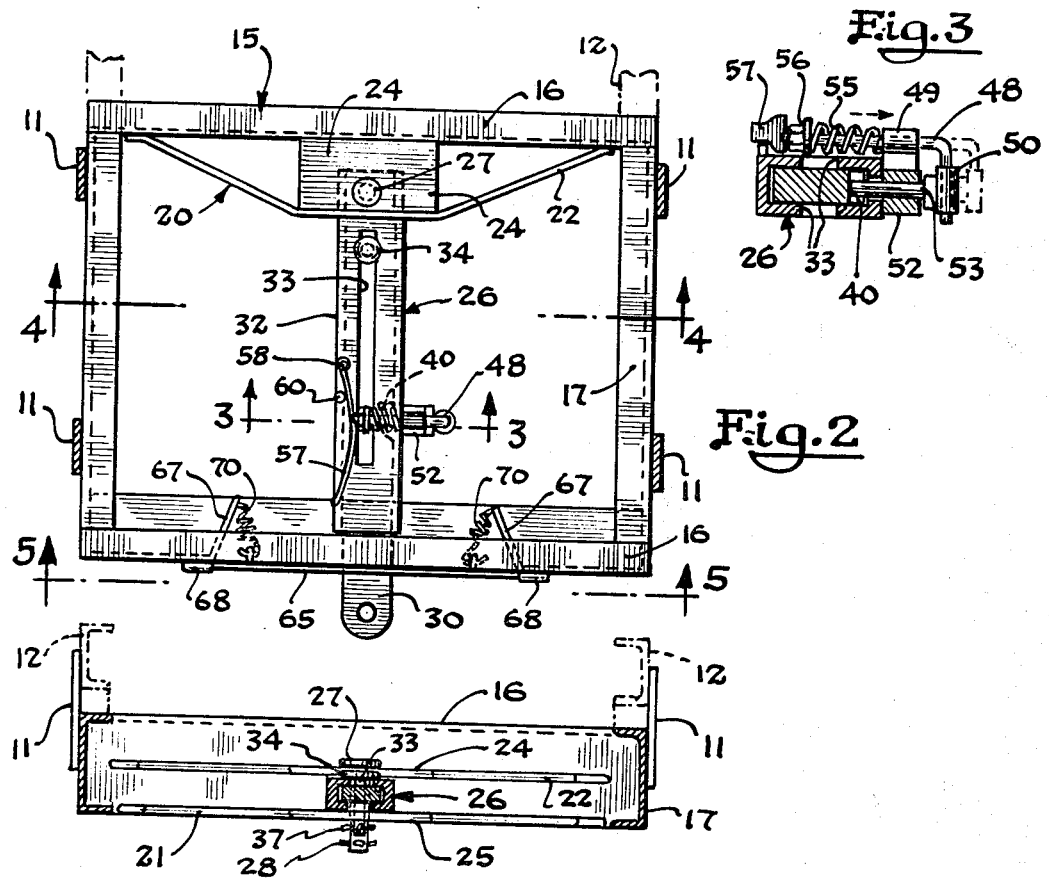
Inventor
Wilbert L. Luinstra
By Roy G. Story
Attorney Nov. 12, 1968

W. L. LUINSTRA 3,410,577

COUPLING DEVICE

Filed Sept. 15, 1966

Inventor
Wilbert L. Luinstra
By Roy G. Story
Attorney

United States Patent Office 3,410,577
Patented Nov. 12, 1968

3,410,577
COUPLING DEVICE
Wilbert L. Luinstra, May City, Iowa 51349
Filed Sept. 15, 1966, Ser. No. 579,612
8 Claims. (Cl. 280—478)

ABSTRACT OF THE DISCLOSURE

A coupling device for hitching a motor vehicle to machinery to be towed. The device is a manufactured unit comprising a rectangular shaped angle iron frame and a tongue assembly pivoted to the front of the frame and confined to swing in a slot in the rear of the frame. The tongue assembly comprises a casing, a tongue extendable and retractable in the casing and latches for holding the tongue in towing position and at predetermined lengths. The frame is also provided with special supports associated with the pivoting device and with the slot in which the tongue swings laterally.

---

This invention relates to a coupling device and has to do more particularly with a device for connecting machinery and the like to motor vehicles such as trucks and tractors.

An object of the invention is to provide an improved integral coupling device which may be used in connection with various vehicles and movable machinery.

Another object of the invention is to make available to owners of vehicles a detachable towing gear which has considerable flexibility for use with light and heavy machinery.

A further object of the invention is to provide a coupling device which can be located out of the way under the rear of a motor vehicle but is readily accessible for attaching to the machinery to be towed.

Still another object of the invention is to produce an improved extendable tongue which is capable of swinging through a wide angle and which is equipped with suitable stops and safety devices.

Also an object of the invention is to provide an improved latch for the tongue which is self-locking to hold the tongue in a fixed position after the coupling has been affixed to the machinery to be towed.

Other objects of the invention will be apparent from the following description and illustrative drawings of the invention.

FIGURE 1 is a perspective view of a pickup truck showing the coupling device mounted under the rear of the truck.

FIGURE 2 is a top view partly in section of the coupling device taken along a plane immediately under the frame of the truck.

FIGURE 3 is a sectional view along the line 3—3 of FIGURE 2.

FIGURE 4 is a cross sectional view along the line 4—4 of FIGURE 2.

Figure 5:
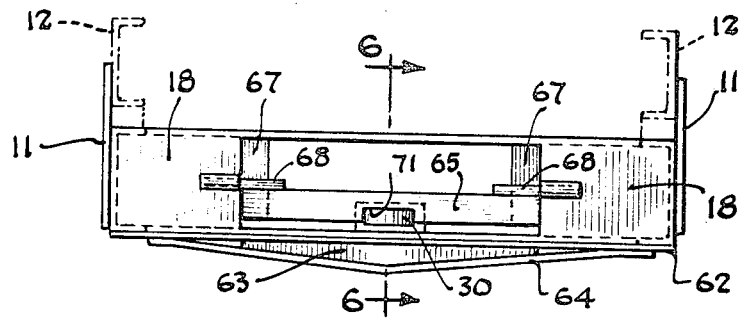
FIGURE 5 is a view partly in section from a plane along the line 5—5 of FIGURE 2.

Although the coupling device may be used with various vehicles, it is shown for purposes of illustration in FIGURE 1 mounted under the rear frame of a pickup truck 10. Upright brackets 11 secure the coupling to the frame 12 of the truck as shown in FIGURES 2, 4 and 5. Holes are drilled in the tops of the brackets to bolt them to the frame of the truck. The bottoms of the brackets are welded to the coupling frame.

While the coupling is shown in the drawings as mounted by the upright brackets 11, it is contemplated that other means of securing the coupling to the vehicle may be used. In some instances it may be advantageous or convenient to use horizontal rather than vertical means for fastening the coupling to the vehicle and, in that event, elongated, horizontal, flat bars for example may be welded to the top outside edges of the frame of the coupling. A series of holes may be provided in the bar to bolt the bar and the coupling to the underside of the vehicle.

The coupling device comprises a frame shown generally as 15 (FIG. 2). The frame is composed of end and side pieces 16 and 17 respectively. Channel irons have been found suitable for the ends and sides of the frame. The flat side of the channel iron is on the inside of the front end and the flat side is on the outside of the rear end of the frame. The flat sides are on the outside on both channel irons of the sides of the frame. The rear end of the frame comprises two sections 18 on each side (FIG. 5) with the middle section cut away to provide for a latch door described hereinafter.

Figure 8:
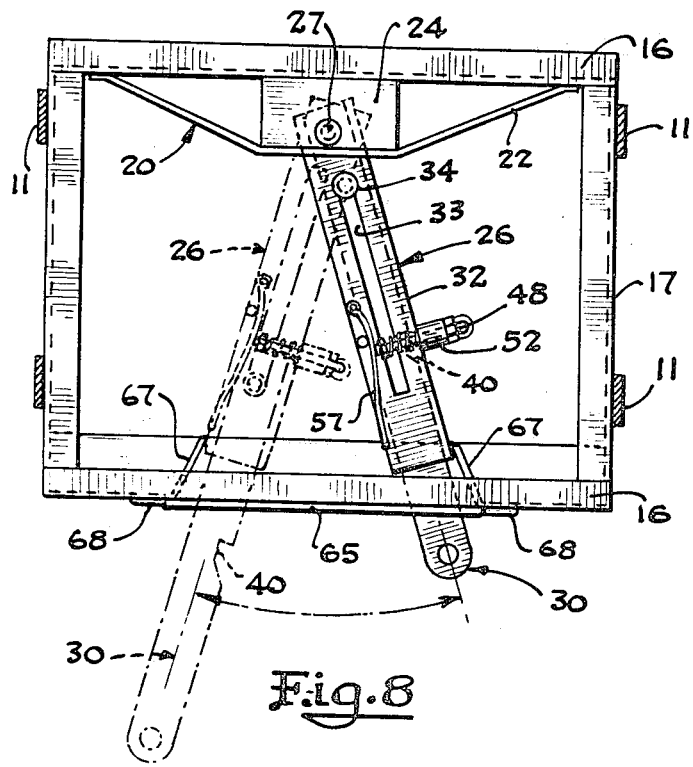
FIGURE 8 is a top view similar to that of FIGURE 2 but showing the tongue swung to the side and in an extended position.

Attached to the inner side of the front wall of the frame is a brace shown generally as 20 in FIGURES 2 and 8. The brace is preferably made of a pair of rods 21 and 22 (FIG. 4). The brace supports two flat, parallel plates 24 and 25 which may be welded to the front bar 16 of the frame. The plates 24 and 25 are adapted to secure a tongue assembly shown generally at 26 in FIGURE 2. The front end of the tongue assembly is held between the plates 24 and 25 by a pin 27 which fits through holes in the plates and in the tongue assembly and is held in place by a cotter key 28 as shown more clearly in FIGURE 6. The tongue assembly is adapted to swing on the pivot pin 27 as shown in FIGURE 8. The pivot pin also serves as a towing pin and as a stop for the end of the tongue 30 as explained more fully hereinafter.

The tongue assembly 26 comprises a housing 32 (FIG. 2) which is a rectangular iron shell to receive the telescoping tongue 30. The top and bottom sides of the housing are provided with channels or slots 33 in which a stop pin 34 slides. The stop pin 34 is equipped with a head 35 and a cotter pin 37 (FIG. 6) to hold it within the slot. The stop pin 34 fits into a hole 38 in the front end of the tongue 30 (FIG. 7) and serves to restrain the tongue so that it cannot travel beyond the bounds of the slot 33. When the tongue is in a closed position as in FIGURE 2, the stop pin 34 rests against the front end of the slot 33 and when the tongue is in an extended or open position the stop pin rests against the rear end of the slot as shown in FIGURE 8. In a closed position the front end of the tongue rests against the towing pin 27 as a safety feature. Also the pin 34 supplies a safety feature of preventing the tongue from pulling out in case the latch shown in FIGURE 3 should fail to operate in the coupling notch 40 of tongue 30 (FIG. 7).

Figure 7:
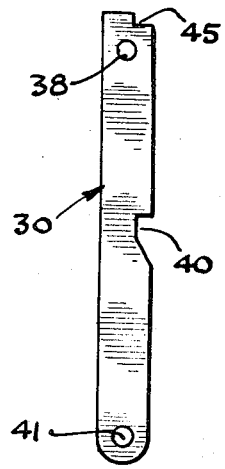
FIGURE 7 is a plan view of the tongue detached from the rest of the device.

The tongue as shown detached in FIGURE 7 comprises an elongated, flat bar with a hole 38 in one end to receive the stop pin 34 and a hole 41 in the other end to receive a bolt or other device for attaching to the machinery to be pulled. The tongue also is provided with a coupling notch 40 to hold the tongue in a towing position and a lock-out notch 45, the latter serving to lock the tongue in a fully extended position as explained hereinafter. The latch shown in FIGURE 3 is associated with the tongue in such a way as to automatically snap into the notches 40 and 45 when the tongue is extended whereby the notches coincide with the latch.

The latch (FIG. 3) comprises a bolt 48 which is bent at a right angle and which extends through a horizontal sleeve 49 and a vertical sleeve 50 both of which are secured to a plunger housing 52. Attached to the vertical portion of the bolt 48 is a plunger 53, the end of which extends through the side wall of the housing 26 of the tongue to engage the notches 40 and 45 of the tongue 30. A spring 55 surrounding a portion of the horizontal section of the bolt 48 and held in position by the sleeve 49 and a collar 56 normally urges the bolt 48 in a closed position whereby the plunger is forced to engage the notches 40 and 45 of the tongue.

A hand operated release lever 57 (FIG. 2) which is pivoted to a bolt 58 and controlled by a stop 60 rests against the free end of the horizontal portion of the bolt 48. The release lever is adapted to force the spring-loaded bolt 48 to an open position as shown by the dotted lines in FIGURE 3 so that the plunger 53 will become disengaged from the notches in the tongue.

Figure 6:
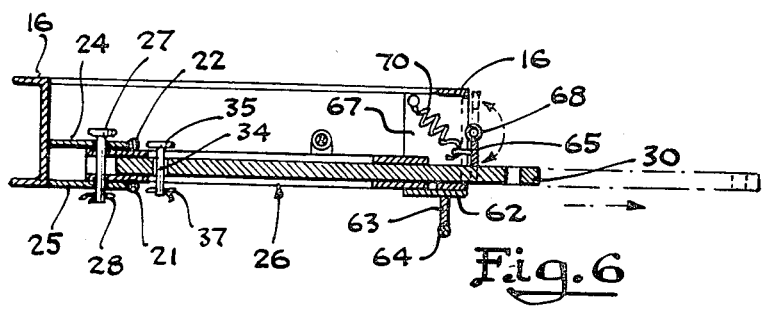
FIGURE 6 is a view of the vertical cross section along the line 6—6 of FIGURE 5.

Referring to FIGURES 5 and 6, the underside of the front end of the coupling assembly is provided with a floor plate 62 secured to the bottom side of the rear bar 16 of the frame. Below the plate 62 is a truss iron 63 tapered at each end. The truss iron is supported by a brace rod 64 which is secured to the frame adjacent the ends of the plate 62. The truss iron and brace rod provide a support and reinforcement for the end of the frame to support stresses put on the hitching end of the tongue particularly when it is extended as shown by the dotted lines in FIGURES 6 and 8.

Attached to the rear end of the coupling assembly is a latch door 65 which is pivoted by pins 68 at each end to a pair of sloping side plates 67. The pins 68 are welded to the latch door 65 and fit into bushings in the side plates 67. The latch door 65 may be lifted as shown in FIGURE 6 to an open position to allow the tongue 30 to swing from side to side to facilitate hitching the tongue to the machinery to be towed. Springs 70 attached to each end of the latch door 65 and to the side plates 67 normally urge the door to a closed position. In the center lower portion of the latch door is a rectangular cut out portion forming an opening 71 (FIG. 5) to fit down over the tongue and to hold it in a straight position for towing.

The operation of the coupling device will now be described. FIGURES 1 and 2 show the device in a closed position. In this position, the tongue is completely telescoped into the tongue housing with the front end resting against the pivot pin 27. The latch bolt 53 is closed in the notch 40 of the tongue. The coupling device is normally in a closed position when not in use, although for short hitches the device may be used in this position for towing and in such case the pin 27 and the latch bolt 53 are locked in notch 40 to bear the towing load. When it is desired to extend the tongue, the lever 57 is pressed to release the bolt 53 from the notch 40 and the tongue is pulled all the way out until the stop pin 34 reaches the end of the channel 33. The hinged latch door 65 is then raised and the tongue is swung either to the right or to the left within the bounds of the sloping plates 67 to facilitate hitching of the coupling to the machinery to be towed. When the hitch has been made the tongue is moved to the center of the frame so that the opening 71 in the latch door snaps down over the tongue to hold it in place. If the tongue is to be used in a fully extended position, then the latch cooperates with the notch 45 of the tongue to lock it in position. To shorten the tongue the latch bolt is released from notch 45, lever 57 pressed and the tongue shoved back to notch 40. The latch bolt 53 is then snapped into the notch and the coupling is ready for use. To completely telescope the tongue, the lever 57 is pressed and the tongue pushed back so that the front end rests against the pivot pin 27. When backing up to a loading dock, it is advantageous not to have the end of the tongue extending from the end of the truck. In such case the cotter key 37 is removed, the stop pin lifted from hole 38, the lever 57 pressed and the tongue slipped out of its housing.

The coupling device may be used with various sizes and types of machinery. It has utility in areas where power vehicles are used in farming. In such operations tractors and trucks are used to pull many kinds of machinery and it is desirable to secure and disengage easily and quickly the vehicle from the attached equipment. The present coupling has been used for connecting tractors and trucks to machinery for applying plant food and other chemical materials to fields.

Coupling devices proposed heretofore have the disadvantage of being designed for special uses and for location in awkard positions. Also they are often difficult to hitch to machinery and are lacking in desired safety features.

The coupling of the present invention has the advantage of variable swing and length of tongue making easy hitching. Also the coupling has automatic means for holding the tongue in position and has built-in safety features which improve its usefulness.

I claim:

1. A coupling device for vehicles comprising a generally rectangular shaped frame having end and side members adapted to be fastened to the underside of the body of a towing vehicle with the rear end member of the frame being substantially flush with the back end of said body, a tongue assembly secured at one end by a pivoting device to the inner wall of the front end member of the frame, an aperture in the rear member of the frame for the other end portion of the tongue assembly to swing laterally therein, said rear member having a reinforcement support for the tongue assembly under said aperture, said tongue assembly having a casing one end of which is secured to said pivoting device and the other end being open, a tongue extending and retracting in telescopic relation with the open end of said casing, said pivoting device serving as a stop to limit the extent of retracting of said tongue, latching devices for controlling the tongue assembly, one of said latching devices being mounted on said casing at a point intermediate the ends thereof to control the extension and retraction of the tongue at predetermined positions, and another of said latching devices affixed to the outer wall of the rear end of the frame to hold the tongue in a towing position.

2. A device substantially as described in claim 1, in which the pivoting device comprises two parallel plates between which one end of the tongue assembly is pivoted with a pin and each of said plates being affixed to the front member of the frame and supported by a brace rod attached to the plates and secured to said end member.

3. A device substantially as described in claim 1, in which the end and side members are angle irons.

4. A device substantially as described in claim 1, in which the reinforcement support under the aperture of the rear member of the frame comprises a truss iron tapered at each end and supported by a brace rod which is secured to the rear end member of the frame adjacent the tapered ends of the truss iron.

5. A device substantially as described in claim 1, in which the rear end member of the frame is separated into two sections by the aperture and is provided with sloping side plates which are located at each end of the aperture and define the boundaries of the lateral swing of the tongue.

6. A device substantially as defined in claim 5 in which the latching device attached to the outer wall of the rear end member of the frame comprises a hinged door with an opening for fitting over the tongue and springs operating between the door and the sloping side plates to urge said door closed whereby the opening therein snaps over the tongue to hold it in a towing position.

7. A device substantially as described in claim 1 in which the latching device mounted on the casing comprises a spring loaded right angle bolt operating a plunger laterally through holes in the casing and the telescopic tongue to hold the tongue in extended or retracted positions.

8. A device substantially as defined in claim 1 in which the latching device attached to the outer wall of the rear end member of the frame comprises a hinged door with an opening for fitting over the tongue and springs operating between the door and the sloping side plates to urge said door closed whereby the opening therein snaps over the tongue to hold it in a towing position.

References Cited

UNITED STATES PATENTS

| | | | |
|---|---|---|---|
| 1,068,334 | 7/1913 | Goodhue | 280—482 X |
| 1,422,189 | 7/1922 | Eckhertz | 280—478 |
| 2,357,540 | 9/1944 | Palmer | 280—478 |
| 2,446,223 | 8/1948 | Forney | 280—482 X |
| 2,818,276 | 12/1957 | Sprang | 280—482 |
| 3,126,210 | 3/1964 | Hill | 280—478 |
| 3,140,881 | 7/1964 | Antici | 280—478 |

LEO FRIAGLIA, *Primary Examiner.*